Jan. 8, 1946.    N. T. MacKENZIE    2,392,751
WOODEN PLUG
Filed April 19, 1944
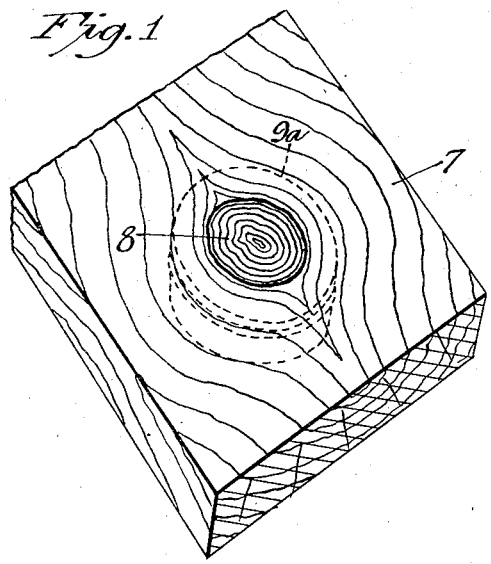
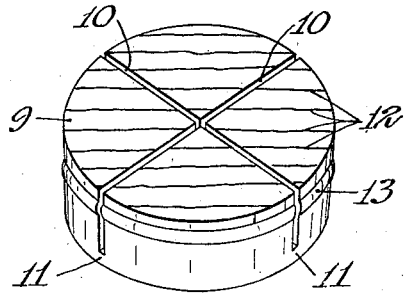
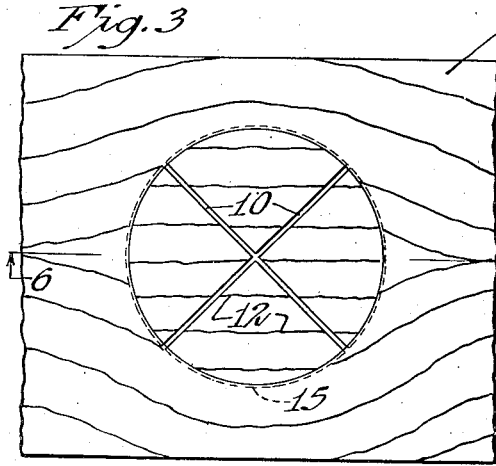
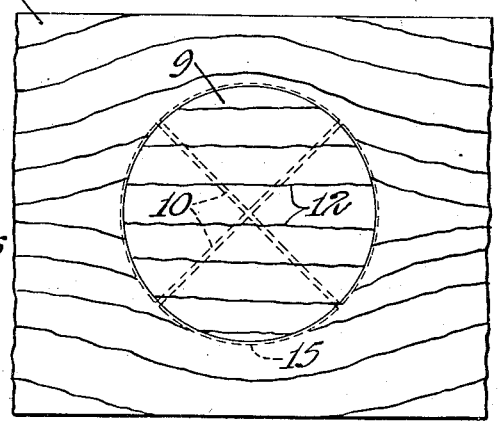
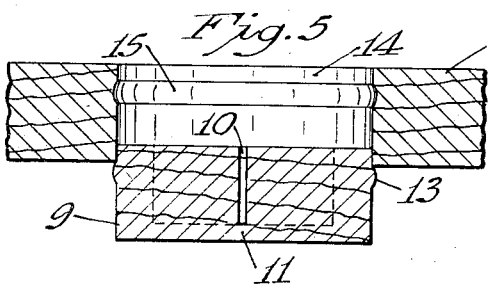
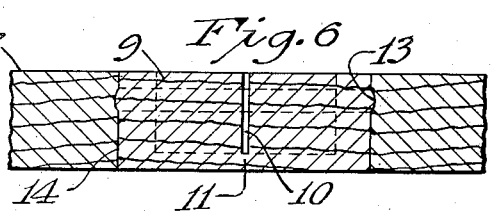
INVENTOR.
Neal T. MacKenzie
BY
John E. Stryker, jr.
ATTORNEY Patented Jan. 8, 1946

2,392,751

UNITED STATES PATENT OFFICE 2,392,751

WOODEN PLUG

Neal T. MacKenzie, St. Paul, Minn., assignor to General Timber Service, Inc., St. Paul, Minn., a corporation of Delaware Application April 19, 1944, Serial No. 531,767

4 Claims. (Cl. 20—93)

This invention relates to wooden plugs for repairing defects in lumber and for other purposes.

It is an object of the invention to provide such plugs to fill holes cut in the lumber and so constructed as to remain in place without dependency on adhesive coated contact areas.

A particular object is to provide a substantially cylindrical wooden plug which is rendered radially contractile by saw kerfs or narrow slits extending obliquely to the grain of the wood and having a tongue and groove peripheral connection with the surrounding material.

An important field of use for my invention is that of improving the merchantability of lumber having serious knot defects. Such defects render some species of wood, including white fir, and the lower grades of Douglas fir, ponderosa and Idaho white pine for example, of little value as lumber since a large proportion of the knots are so loosely held in place that they are lost during the machining and handling of the products. The grade of these and many other species of lumber may be improved at low cost by repairing the defects according to the present invention. My procedure is to cut away the defective parts, using a rotary tool, whereby an annular opening or recess of the desired size and shape is formed, and then to fill each of the holes so formed with one of my improved plugs. Adhesive is ordinarily applied to the annular contact surface before the plug is inserted but the adhesive cannot be depended on to hold the plug in place immediately and it is so formed as to securely interlock with the surrounding wood. This interlocking prevents it from being dislodged during the time required for the adhesive to set and permits machining of the products immediately after the plugs have been inserted.

Referring to the accompanying drawing:

Figure 1 is an isometric view showing a fragmentary portion of a board having a typical knot defect and indicating in broken lines the portion of the board which is to be replaced by a plug.

Fig. 2 is an isometric view showing one of my improved plugs;

Fig. 3 is a top plan view of the board and plug in assembled relation;

Fig. 4 is a bottom plan view of the same;

Fig. 5 is a central, vertical sectional view through the board and plug, showing the latter in its starting position with respect to the preformed hole in the board, and Fig. 6 is a section taken on the line 6—6 of Fig. 3 showing the plug in place.

In the drawing a board to be repaired is indicated by the numeral 7, a defect comprising a loose knot by the numeral 8 and the part to be cut away by the broken lines 9a. This part is replaced by one of my plugs 9. The plug is generally cylindrical in shape and is formed with saw kerfs 10 extending diametrically across it to such depth as to leave thin portions 11 of the wood at the bottom of each kerf to resiliently connect the several segments formed by the kerfs. Two kerfs extending at right angles to each other are preferred, as shown, both being disposed approximately at an angle of 45 degrees to the grain of the wood. One or more additional kerfs may be provided but none of them should extend in parallel relation to the grain. Otherwise, splitting of the plug when it is forced to contract, as hereinafter described, might result. Projecting slightly from the periphery of the plug 9 is an annular bead or tongue 13. This tongue is located near the kerfed face of the plug so that it may be sprung into a groove at the periphery of a cylindrical opening in the board 7.

As best shown in Fig. 5, a cylindrical opening 14 is cut in the board 7 to receive and closely fit the plug 9 and an annular groove 15 is cut in the cylindrical surface defining the opening to receive the tongue 13. A special rotary tool may be used to form the opening 14 and groove 15, otherwise they may be formed respectively by an ordinary drilling operation followed by a reaming operation in which the tool head is provided with a radially extensible tooth or teeth. The plug 9 is formed by a simple turning operation, as in an automatic lathe. As shown in Fig. 4, the kerfs 10 do not extend to the bottom face of the plug. The joint at the periphery of the plug and the kerfs 10 at the upper face thereof may be filled and rendered inconspicuous by the use of a suitable plastic in the finished product.

In proceeding to repair lumber according to my invention, the openings 14 with their associated grooves 15 are cut in the boards at the sites of the various defects. To insert a plug it is only necessary to start it into an opening, as indicated in Fig. 5, and then to force it into final place while contracting the segments and substantially closing the kerfs 10. Such contraction is necessary to permit the tongue 13 to pass into and through the opening 14. When the tongue reaches the groove 15 the natural resiliency of the thin portions 11 causes the tongue to spring into the groove, and securely retain the plug in place. A suitable adhesive should be applied to the interior surface of the opening 14 or exterior of the plug before the plug is inserted so that, during the seating of the plug, an adequate amount of the adhesive is forced into the annular groove 15 where it is retained under pressure by the tongue 13 and adjacent cylindrical joint surfaces. This insures a satisfactory glue line and strong permanent connection between the plug and the surrounding material. Before the adhesive has set the plug should be so placed that its longitudinal grain 12 is substantially parallel to the longitudinal grain of the board 7 or other wood product. Since the wood swells and shrinks crossways of the grain, this arrangement of the plugs avoids excessive internal stresses when the products are subjected to various extremes of moisture absorption.

Having described my invention, what I claim as new and desire to protect by Letters Patent is:

1. In a device of the class described, a wood product formed with a substantially cylindrical opening and a peripheral groove in the surface defining said opening, a wooden plug fitting in said opening and formed with kerfs dividing it into relatively contractile segments with attenuated members resiliently joining said segments together and a peripheral projection on each segment adapted to interlock with said groove, said attenuated members normally retaining said projections in engagement with said groove and said projections being spaced longitudinally of the plug from both ends thereof and being tapered to cause contraction of the segments by sliding contact with the surface defining said opening when the plug is forced into the opening.

2. In a device of the class described, a wood product having an annular opening to be filled and a plug fitting in said opening and having a peripheral interlocking connection with the surface defining said opening, said plug being divided into relatively contractile segments by kerfs extending in from one end surface thereof to a depth sufficient to leave relatively thin portions connecting the segments together and extending from the inner extremity of the kerfs to the opposite end surface of the plug for resiliently maintaining said interlocking connection.

3. In a device of the class described, a wood product formed with a substantially cylindrical opening and a peripheral groove in the surface defining said opening, a wooden plug fitting in said opening and formed with a projection adapted to fit in interlocking relation with said groove, said projection being spaced inward along the plug from both end surfaces thereof and the plug being divided into relatively contractile segments by kerfs extending in from one end surface thereof to a depth sufficient to leave relatively thin members connecting the segments together between the inner extremity of the kerfs and opposite face of the plug, said thin members being sufficiently resilient to normally expand said plug to retain said projection in engagement with the surfaces defining said groove, said kerfs extending in planes disposed obliquely to the grain of the plug and the grain of said plug extending in substantially parallel relation to the grain of said product.

4. In a device of the class described, a wood product having an annular opening to be filled interrupting the respective opposite faces of the product and a plug fitting in said opening with opposite end surfaces flush with the respective faces of the product and having a peripheral tongue and groove connection with the surface defining said opening, laterally extending kerfs being formed in the plug to divide it into relatively contractile segments, said kerfs extending from one end surface of the plug to a depth such as to leave flexible, attenuated portions of the wood extending from the inner extremities of the kerfs to the opposite end surface of the plug.

NEAL T. MacKENZIE.